E. H. SAVAGE.
TRACK WHEEL SUSPENSION FOR TRACK LAYING TRACTORS.
APPLICATION FILED SEPT. 8, 1919.
1,359,538.
Patented Nov. 23, 1920.
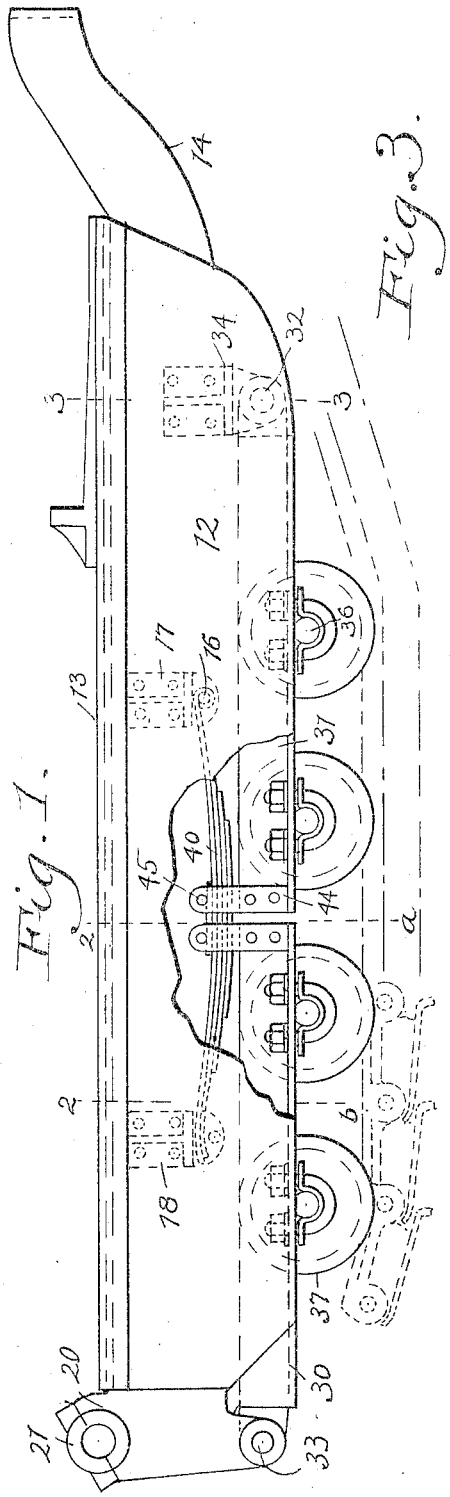
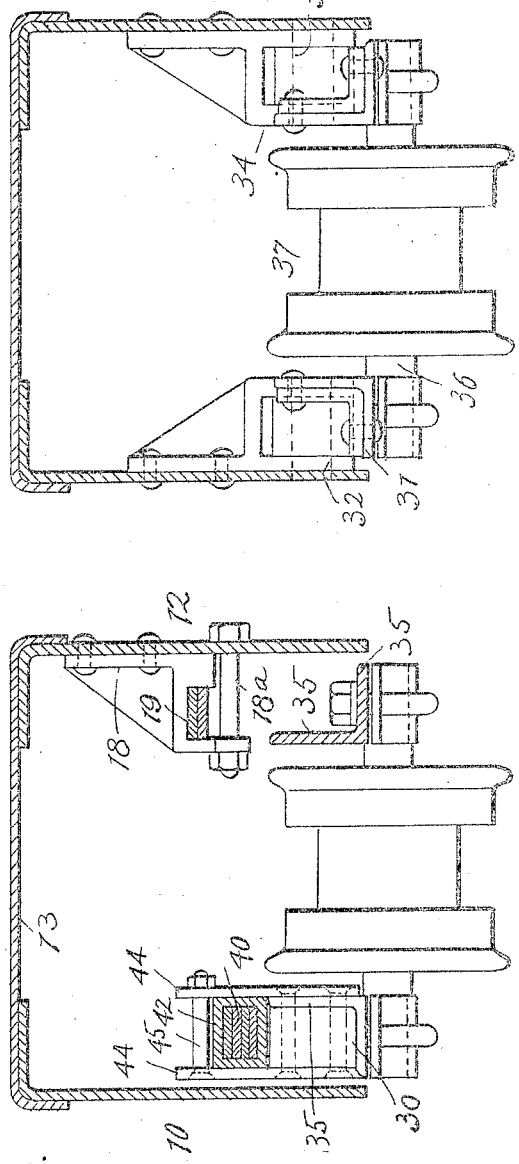
Inventor
Edwin H. Savage.
By
Thurston Kwis & Hudson
Attys.

UNITED STATES PATENT OFFICE.

EDWIN H. SAVAGE, OF CLEVELAND, OHIO, ASSIGNOR TO THE CLEVELAND TRACTOR COMPANY, OF EUCLID, OHIO, A CORPORATION OF OHIO.

TRACK-WHEEL SUSPENSION FOR TRACK-LAYING TRACTORS.

1,359,538.

Specification of Letters Patent. Patented Nov. 23, 1920.

Application filed September 8, 1919. Serial No. 322,545.

*To all whom it may concern:*

Be it known that I, EDWIN H. SAVAGE, a citizen of the United States, residing at Cleveland, in the county of Cuyahoga and State of Ohio, have invented a certain new and useful Improvement in Track-Wheel Suspensions for Track-Laying Tractors, of which the following is a full, clear, and exact description.

This invention is an improvement in the kind of track laying tractors typified in the White Patent No. 1,253,319 in which two track frames lie on opposite sides of the main frame and are pivoted thereto near their rear ends, and have certain resilient load supporting connections interposed between their front ends and the main frame.

The invention relates to novel means by which the track wheels are mounted on these track frames; the primary object of the invention being to relieve the machine of shocks and jars to which it would otherwise be subjected when the track belts, during use of the tractor, are laid down on rough ground.

The invention consists in the construction and combination of parts shown in the drawing and hereinafter described and definitely pointed out in the appended claims.

In the drawing, Figure 1 is a side elevation partly broken away of one of the track frames to which the present invention is applied. Fig. 2 is a vertical transverse section taken in two planes, the left half of this figure being in the plane indicated by line 2ª on Fig. 1, and the right side being on the plane of line 2ᵇ on Fig. 1. Fig. 3 is a transverse vertical section in the plane of line 3—3 on Fig. 1.

The so-called track frame comprises essentially two parallel spaced apart vertical longitudinally extended side beams 10 and 12. In the specific construction shown, which, however, is not essential to the present invention, the two side beams of the track frame are also connected and held in spaced relation by a top plate 13. A bearing box bracket 20 is secured to the rear end of each of these side beams by any suitable means. The boxes 21 carried by these brackets are for the purpose of pivotally embracing an axle fixed to the main frame whereby the side frame will be pivotally connected at its rear end with the main frame. A yoke 14 is connected with the front end of the track frame and it is to this yoke that the resilient load supporting means or front spring suspension means are connected. The construction, to the extent described, is that of a known tractor, to which this invention is applied.

The two trucks 30 and 31 are associated with each track frame; and they are arranged in alinement, and are located between the two side beams of the track frame. The truck 31 is pivotally connected at its front end on a transverse pivot 32 with the track frame, while the rear truck 30 is pivotally connected at its rear end by means of a transverse pivot 33 with said track frame. As shown this pivot 33 is supported by the brackets 20.

Each truck comprises two parallel spaced apart side bars 35. Each of these bars is an angle bar, and the bars are placed so that the horizontal parts thereof project away from one another, that is, they are outwardly extended. The front pivot 32 is a rock shaft which is rotatively mounted in two brackets 34 which are respectively connected with the inner faces of the two side beams 10, 12, of the track frame. Shafts 36 extend between and are clamped to the side bars 35 of the truck, and the track wheels 37 are rotatably mounted upon these shafts between said side bars.

There is a resilient load supporting connection between the adjacent ends of these two trucks and the side beams of the track frame. To produce this, two leaf springs 40 are provided. At their front these leaf springs, or rather, the master leaf thereof, has a pivotal connection with a stud 16 which stud is carried by a bracket 17, one of these brackets being riveted to the inner face of each of the side beams 10, 12.

Other brackets 18 are riveted to the inner faces of these two side beams in position to engage the rear ends of said leaf springs. Each of these brackets has a spring seat flange 19 against the upper face of which the rear end of the associated leaf spring engages. There is likewise a bolt 18ª connected with the bracket 18, and with the associated side bar of the track frame which goes beneath the rear end of the leaf spring, so as to prevent it from coming out of operative engagement with said spring seat flange.

The several leaves of the leaf spring may be connected together near their middle points in the usual manner, and, as shown, they are embraced by a box 42 which is immovably fixed around them. Two outwardly extended bars 44 are fixed to each side bar of each truck frame near the free end thereof. Each pair of bars 44 go up on opposite sides of a box 42, and a bolt 45 extends between and connects the two bars 44 and overlies the said box 42.

From the foregoing description it will be apparent that the adjacent free ends of two trucks may move upward relative to the track frame; but they do not so move independently of each other because when one goes up or down the adjacent end of the other truck gets a corresponding motion because of the described connections. These upward movements however, are yieldingly resisted by the leaf spring 40.

Various changes may be made in the specific embodiment of the invention shown and described herein, provided the means stated in any of the following claims are the equivalents of such stated means to be employed.

Having described my invention, I claim:—

1. In a track laying tractor of the character specified, the combination of a track frame which includes two spaced apart side beams and has at opposite ends respectively a pivotal and a resilient load supporting connection with the main frame, two trucks which are arranged in alinement, and which, at their remote ends, are pivoted to the track frame, resilient load supporting means interposed between said track frame and the adjacent ends of the two trucks, and track wheels mounted on said trucks.

2. In a track laying tractor of the character specified, the combination of a track frame which includes two spaced apart side beams and has at opposite sides respectively a pivotal and a resilient load supporting connection with the main frame, two trucks which are arranged in alinement between the two side beams of the track frame, which truck frames at their remote ends are pivoted to the track frame, spring seats fixed to said track frame, leaf springs which near their ends engage said spring seats, connections between the adjacent ends of said trucks and said leaf springs near their middle points, and truck wheels mounted on said trucks.

3. In a track laying tractor of the character specified, the combination of a track frame which includes two spaced apart side beams and has at opposite ends respectively a pivotal and a resilient load supporting connection with the main frame, two trucks which are arranged in alinement between the two side beams of the track frame, which truck frames at their remote ends are pivoted to the track frame, a pair of spring seats fixed to the inner face of each of the side beams of the track frame, two leaf springs each of which engages near its ends with a pair of said spring seats, a box embracing the middle part of each leaf spring, and means connecting the adjacent ends of said trucks with said box, and track wheels mounted on said trucks.

4. In a track laying tractor of the character specified, the combination of a track frame which includes two spaced apart side beams and has at opposite ends respectively a pivotal and a resilient load supporting connection with the main frame, two trucks which are arranged in alinement between the two side beams of the track frame, each truck frame comprising two parallel side bars, two rock shafts each of which is mounted in a pair of bearings secured respectively to the side beams of the track frame, means clamping the side bars of one truck with one of these rock shafts, means clamping the side bars of the other truck to the other rock shaft, transversely extended shafts fixed to the side bars of said trucks, track wheels rotatably mounted upon said shafts, and resilient connections between the adjacent ends of said trucks and said track frame.

5. In a track laying tractor of the character specified, the combination of a track frame which includes two spaced apart side beams and has at opposite ends respectively a pivotal and a resilient load supporting connection with the main frame, two trucks which are arranged in alinement between the two side beams of the track frame, each truck frame comprising two parallel side bars, two rock shafts each of which is mounted in a pair of bearings secured respectively to the side beams of the track frame, means clamping the side bars of one truck with one of these rock shafts, means clamping the side bars of the other truck to the other rock shaft, transversely extended shafts fixed to the side bars of said trucks, track wheels rotatably mounted upon said shafts, two leaf springs, a pair of brackets secured to one side beam of the track frame carrying spring seats with which one of said leaf springs engages near its ends, a second pair of brackets secured to the other side beam of said track frame and carrying spring seats with which the other leaf spring engages near its ends, means connecting one of these leaf springs with the side bars on one side of both truck frames near their adjacent ends, other means connecting the other leaf spring with the other two alined truck side bars near their adjacent ends.

In testimony whereof, I hereunto affix my signature.

EDWIN H. SAVAGE.